United States Patent

Zinnbauer et al.

[11] 3,841,138
[45] Oct. 15, 1974

[54] APPARATUS AND METHOD FOR FORMING AN ELONGATED TUBULAR MEMBER

[75] Inventors: Frederick W. Zinnbauer, Dearborn; Jack C. Ferner, Detroit, both of Mich.

[73] Assignee: Reynolds Metals Company, Richmond, Va.

[22] Filed: Oct. 25, 1972

[21] Appl. No.: 300,643

[52] U.S. Cl. ................................. 72/369, 72/466
[51] Int. Cl. ....................................... B21d 9/03
[58] Field of Search .......... 29/421, 422, 455; 72/57, 72/75, 353, 369, 370, 466, 398

[56] References Cited
UNITED STATES PATENTS

| | | | |
|---|---|---|---|
| 612,279 | 10/1898 | Sevette | 72/57 |
| 1,565,063 | 12/1925 | Cotton | 72/57 |
| 2,897,872 | 8/1959 | Huet | 72/57 |
| 3,124,090 | 3/1964 | Zatyko | 72/353 |
| 3,328,996 | 7/1967 | Pin et al. | 72/369 |
| 3,335,485 | 8/1967 | Russo | 29/455 |
| 3,383,901 | 5/1968 | Stalter | 72/370 |

*Primary Examiner*—Roy Lake
*Assistant Examiner*—R. Daniel Crouse
*Attorney, Agent, or Firm*—Glenn, Palmer, Lyne and Gibbs

[57] ABSTRACT

An apparatus and method is provided for forming an elongated tubular member made of metallic material wherein a plurality of substantially sperical balls are introduced in the member with the balls being made of a material having a stiffness and strength which is at least substantially equal to the stiffness and strength of the metallic material used to make the tubular member and the balls are held within the member in a compacted manner whereupon the member is formed transversely to its elongated dimension while holding the balls compacted.

13 Claims, 8 Drawing Figures

PATENTED OCT 15 1974    3,841,138
SHEET 1 OF 2
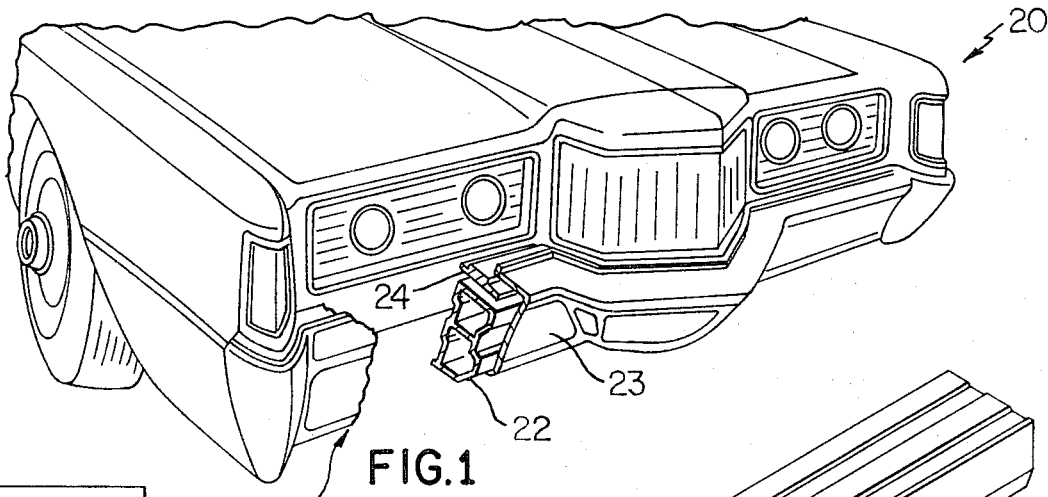
FIG.1
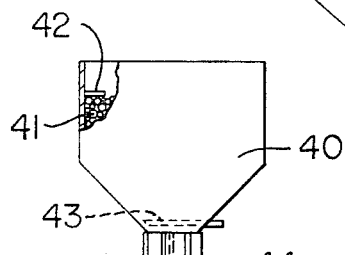
FIG.3
FIG.2
FIG.4
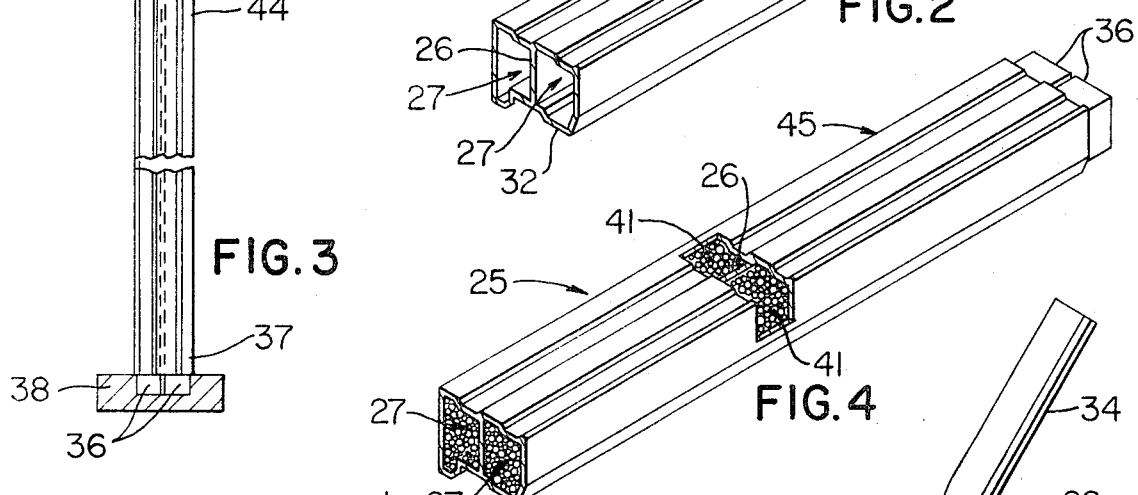
FIG.5
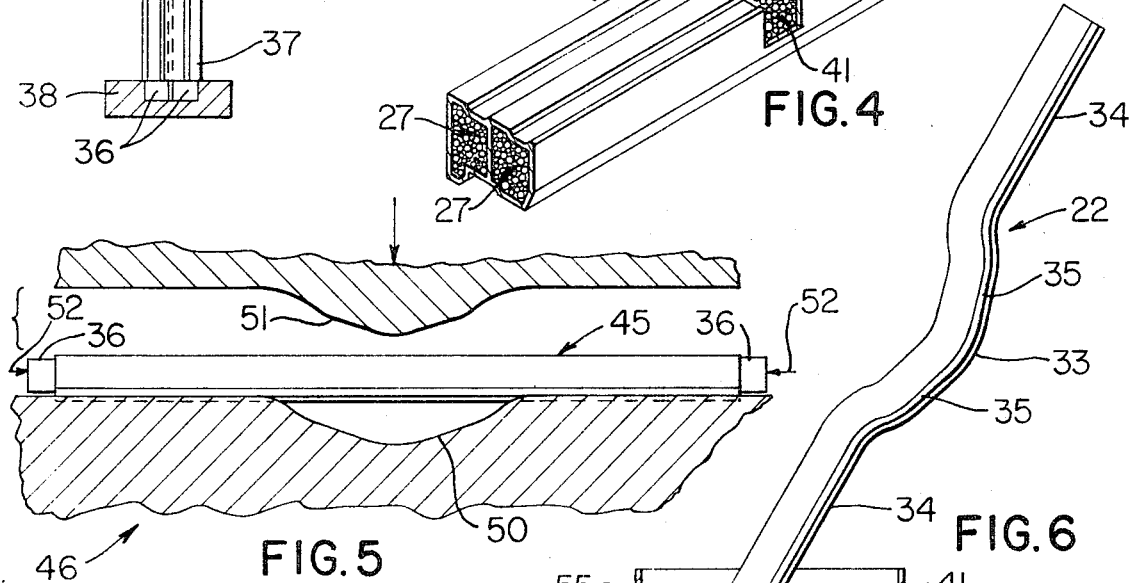
FIG.6
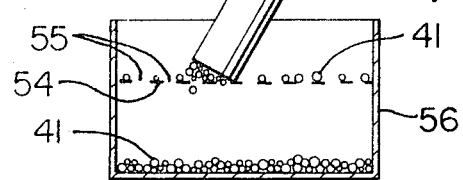

APPARATUS AND METHOD FOR FORMING AN ELONGATED TUBULAR MEMBER

BACKGROUND OF THE INVENTION

In the forming of elongated tubular members of comparatively large cross-sectional outline, such as single or multi-passageway hollow extruded members, it is very difficult to form such members without collapsing the walls or interior web portions thereof, particularly when forming heavy sections of the sort required for making automotive bumper components and the like. Further although numerous apparatus and methods have been proposed heretofore for forming tubular members, the previously proposed apparatus and methods are generally not capable of satisfactorily forming tubular members of the character mentioned above.

SUMMARY

This invention provides an improved apparatus for and method of forming elongated tubular members made of metallic materials, including hollow extruded members made of aluminous material and having, for example, a cross-sectional outline of the character mentioned above, wherein a plurality of substantially spherical balls made of a material having a stiffness and strength at least substantially equal to the stiffness and strength of the metallic material used to make the tubular member are introduced in a member to be formed and held in a compacted manner. The member is then formed transversely to its elongated dimension while holding the balls compacted whereby such member is formed without collapse, buckling, or other adverse deformation.

Other details, uses and advantages of this invention will become apparent as the following description of the exemplary embodiments thereof presented in the accompanying drawings proceeds.

BRIEF DESCRIPTION OF THE DRAWINGS

The accompanying drawings show present preferred embodiments of this invention, in which, FIG. 1 is a perspective view with parts in cross section and parts broken away particularly illustrating a formed elongated tubular member made using the apparatus and method of this invention and utilized as a front bumper structure for an automobile;

FIG. 2 is a perspective view illustrating one exemplary embodiment of an elongated straight tubular member prior to forming thereof;

FIG. 3 is a view with parts broken away illustrating the tubular member of FIG. 2 being filled with substantially spherical balls to enable forming thereof;

FIG. 4 is a perspective view of the member of FIG. 3 with end support or plug devices inserted in opposed ends thereof to hold the spherical balls within such member and with a central portion of such member cut away to show such balls;

FIG. 5 is a schematic presentation illustrating the member of FIG. 4 being formed in an exemplary apparatus which has a cooperating punch and die;

FIG. 6 is a presentation illustrating the member of FIG. 5 after forming thereof and with the end plug devices removed and particularly illustrating the ease with which the spherical balls introduced within such member to enable forming thereof are removed merely by elevating one end of such member to enable the balls to flow from within the member under the influence of gravity;

DESCRIPTION OF ILLUSTRATED EMBODIMENTS

Figure 7:
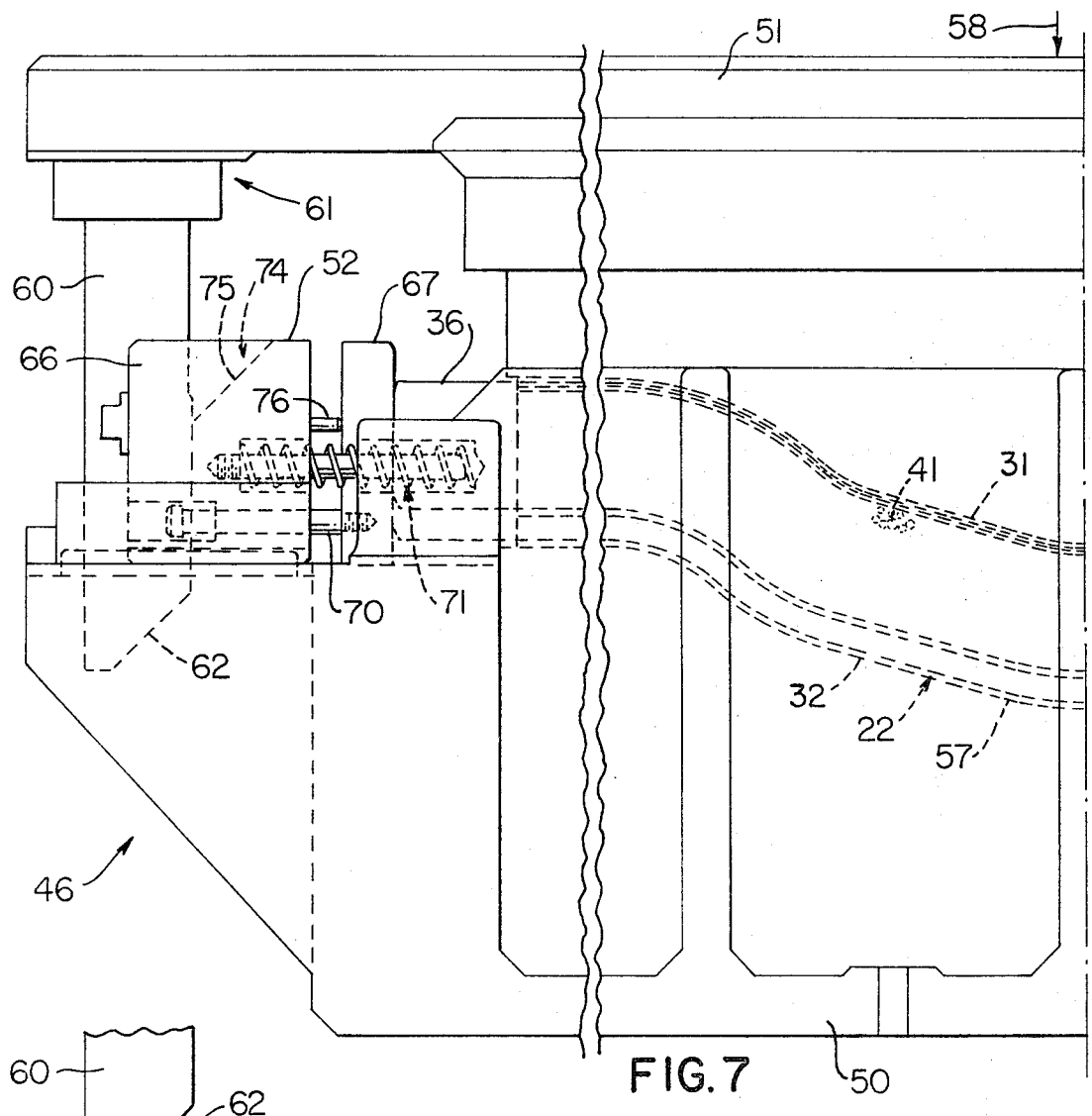
FIG. 7 is a view with parts in elevation and parts broken away of a portion of the apparatus shown schematically in FIG. 5 and located to one side of a vertical plane bisecting such apparatus and particularly illustrating an actuating structure provided on the punch in operative engagement with an associated end support device which is compacting the balls in the elongated member.

Reference is now made to FIG. 1 of the drawings wherein a fragmentary portion of a typical automobile 20 is provided and such automobile has an examplary bumper assembly 21 which includes a contoured bumper structure in the form of a reinforcing construction or member 22 made utilizing the apparatus and method of this invention. The assembly 21 of this example also includes an outermost member 23 which is provided for decorative purposes and is suitably fastened to the structure 22 and a so-called sight shield 24 which serves to shield components of the bumper assembly 21 and other portions of the automobile arranged therebeneath from the view of one looking toward the front of such automobile. Although each member 22, 23 and 24 may be made of any suitable material, in this example member 22 is made of a high strength light weight aluminous material which keeps the weight at the front of the automobile at a minimum while member 23 is made of a thin chrome plated steel and member 24 is made of an elastomeric material.

The construction 22 is suitably fixed to a plurality of energy absorption devices (not shown) which enable the automobile 20 to withstand low speed impact with minimal damage.

The construction or member 22 is made from an exemplary elongated tubular member which is designated generally by the reference numeral 25 in FIG. 2 and although the member 25 may be made utilizing any suitable fabrication technique, it is preferably made by an extrusion process. The member 25 and hence the construction 22 has a roughly B-shaped configuration when viewed in cross section. In particular, member 25 has a planar web 26 which roughly bisects its cross-sectional peripheral outline into a pair of adjoining compartments of roughly equal cross sectional area which for convenience have been given the same reference numeral 27. Each compartment 27 extends the full length of the member 25 and the planar web 26 is arranged approximately parallel to outside surfaces 31 and 32 defining the opposed outside surfaces of the member 25.

The member 25 is formed to define the construction 22 by forming such member so that the web 26 retains its substantially planar configuration. Further, the construction 22 has a contoured configuration defined by a central portion 33 and extensions 34 arranged in rectilinear aligned relation and extending from opposite ends of leg portions or legs 35 comprising the central portion 33.

The member 25 is formed using the apparatus and method of this invention and in a manner heretofore unknown to define the contoured bumper construction 22 whereby the tubular walls of member 25 are prevented from collapsing while the web 26 is prevented from buckling even though forming forces are applied substantially coplanar with and parallel to the plane of web 26 and for a detailed understanding of the forming operation, reference is made to FIGS. 3–6 of the drawings.

In particular, the member 25 is formed by placing an end support device or plug 36 in the open end of each compartment 27 at a lower end 37 of the member 25 whereupon the member 25 is rested on a suitable fixture 38 and then raised and supported by any suitable means substantially vertically as illustrated in FIG. 3 and beneath a hopper 40 which contains a predetermined volume of substantially spherical balls of the same or somewhat different sizes with each ball being designated by the reference numeral 41. The balls 41 are made of a material which has a stiffness and strength which is at least equal to the stiffness and strength of the metallic material used to define the tubular member 25 and for reasons which will be explained subsequently. Some variation in the size of the balls is desirable to achieve good packing effective for transmitting forces among and between the packed balls.

To assure that the desired volume of balls is provided in the tubular member 25, the hopper 40 may be provided with a suitable level indicating means which may be in the form of an annular mark or projection 42 on the inside surface of the hopper 40 and such hopper is filled with balls 41 to the level of mark 42. Further, the hopper 40 has a reduced area opening in its lower end which may be provided with a suitable gate device 43, and once the member 25 is in position beneath the filled hopper 40 the gate 43 is opened allowing the balls 41 to fall by gravity and fill substantially the entire volume of the member 25, particularly each compartment 27 thereof, at least on the region where forming is to take place, whereupon end plug devices 36 are placed in the upper end 44 of the member 25. The member 25 with the balls 41 therewithin and the end plugs 36 in position will be referred to as assembly 45, see FIG. 4, and such assembly is preferably supported in a horizontal position for routine handling and the plugs 36 are held by friction.

The assembly 45 is preferably placed horizontally in a forming apparatus as illustrated schematically in FIG. 5 and such apparatus is designated generally by the reference numeral 46 and may be used in a forming press of conventional or known construction. The apparatus 46 has a die assembly or die 50 and a cooperating punch assembly or punch 51 and suitable holding means or devices 52 which are represented schematically by arrows 52 at opposite ends of the assembly 45 for holding the end plugs 36 in position. The member 25 is formed utilizing the devices 52 to hold the spherical balls 41 within such member in a compacted manner whereupon such member is formed to define the contoured construction 22 illustrated in FIGS. 1 and 6.

The member 25 is formed to define the construction or member 22 with the forming being achieved by the cooperating action of the die 50 and punch 51 in a direction which is substantially transversely to the elongated dimension of member 25 and by applying forming forces substantially coplanar with and parallel to the plane of the web 26 while the balls 41 are being held compacted by the device 52. The balls 41 serve the dual purpose of preventing the web 26 from buckling while simultaneously preventing collapse of the member 25. during the forming action. In addition, the balls prevent wrinkling, buckling or other undesired deformation of the outside surface of the member 25 during the forming thereof.

Once the member 25 is formed to define the contoured bumper construction 22, it is removed from the apparatus 46 using any suitable known means or technique and the end plugs 36 removed whereupon the formed construction 22 is lifted toward a substantially vertical position, as illustrated in FIG. 6, allowing the balls 41 to move from within such member under the influence of gravity. In this disclosure, the member or construction 22 is supported on a perforated screen 54 having openings 55 therein which are substantially larger than the balls 41, so that the balls fall through such openings into a container 56. The balls 41 may be then removed from within such container and used repeatedly in forming other elongated members 25 in the manner described above.

Figure 8:
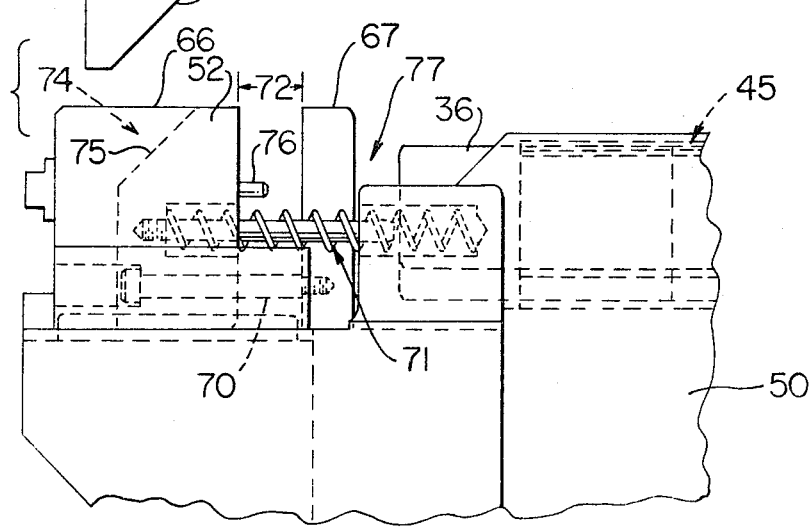
FIG. 8 is a fragmentary view of the left hand portion of the apparatus shown in FIG. 7 and particularly illustrating the end actuating structure prior to engagement thereof against the end support device.

The apparatus 46 is illustrated in more detail in FIGS. 7 and 8 of the drawings and such apparatus comprises the die assembly or die 50 and the punch assembly or punch 51. The apparatus 46 includes end support means or support devices in the form of metal plugs 36 each having an outside configuration which conforms closely to the inside configuration of its associated tubular member and in particular to the inside configuration of its associated compartment 27, and such apparatus 46 also includes the spherical balls 41, a representative few of which are also shown by dotted lines in FIG. 7 of the drawings within the formed tubular member or construction 22.

The die 50 has a suitable configuration, indicated at 57, provided therein which assures the forming of the contoured configuration of the bumper construction 22 illustrated in FIG. 6. The die 50 is preferably detachably fixed to the bed of a press of known construction.

The punch 51 is suitably detachably fixed to the ram of the above-mentioned press and such ram is indicated schematically by an arrow and designated by the reference numeral 58. The punch 51 has end actuating structures 60 provided at its opposite ends and each actuating structure 60 is in the form of a rigid metal member suitably fixed to the punch 51 as indicated at 61 and has a lower inclined cam surface 62 which is adapted to engage an associated device 52 and move such device a predetermined distance against a pair of associated end plugs 36 to assure the balls 41 are firmly compacted during relative movement of the die 50 and punch 51 toward each other.

The device 52 at each end of a tubular member 25 being formed operates to yieldingly urge its associated end plugs 36 toward the center of such elongated member with a compacting force of controlled magnitude to thereby assure that the balls 41 are firmly compacted during relative movement of the punch 51 and die 50 against opposed surfaces 31 and 32 respectively of the assembly 45. The device 52 includes an outer portion 66 which is attached to an inner bearing block 67 by a plurality of threaded bolts 70 and portion 66 has a central cutout 74 therein which has an upper inclined cam surface 75 which is adapted to be engaged by the cam surface 62 of an associated actuating structure 60.

The device 52 also has a pair of spring assemblies 71 arranged in opposite sides of portion 66 which yieldingly urge portion 66 and block 67 apart by a distance indicated at 72 in FIG. 8. Each device 52 also has bearing pins 76 which extend outwardly from portion 66 and engage the inside surface of block 67 and such pins 76 may be rigidly fixed to the portion 66. The pins 76 in this example are held urged outwardly with a predetermined resilient force provided by associated fluid cylinders such as hydraulic cylinders (not shown) whereby an adjustable controlled pressure is applied against block 67 once the cooperating punch 51 and die 50 are in the position illustrated in FIG. 7.

Thus, it will be seen that once each assembly 45 is placed in the apparatus 46 each device 52 at each end thereof is positioned essentially as illustrated in FIG. 8 with its block 67 spaced from its portion 66 and with such block spaced from its associated end plugs 36 as illustrated at 77 in FIG. 8. As the ram 58 of the forming press with which apparatus 46 is associated is actuated, the punch 51 and structures 60 are moved downwardly causing inclined cam surfaces 62 to engage cam surfaces 75 moving portions 66 against their associated blocks 67 thereby overriding the spring devices 71 and urging the plug devices 36 within the tubular member 25 of the assembly 45 to assure that the balls are firmly compacted during relative movement of the punch and die against opposed upper and lower surfaces of the member 25 to define the contoured configuration thereon and the completed member 22. The balls 41 are held compacted with a predetermined controlled force provided by devices 52 and such balls prevent collapse or other deformation of the tubular member 25 while assuring that the planar web 26 does not buckle even though forming forces are applied by the punch 51 and die 50 substantially coplanar with and parallel to the web 26.

As previously mentioned the balls 41 are made of a material having a stiffness and strength which is at least equal to the stiffness and strength of the metallic material used to make the tubular member 25 and preferably such balls have greater stiffness and strength. In particular, in forming a member 25 made of an aluminous material such as 6061 aluminum alloy in the T-4 condition, the balls are preferably in the form of steel balls of the type used in the manufacture of conventional ball bearings and for economical considerations such balls are usually rejects because of size discrepancies preventing their intended use. The balls 41 may vary in size depending on the size of the tubular member 25 being formed. For an extruded tubular member made of an aluminous material and having the previously mentioned Class 3 designation steel balls ranging in diameter from one-eighth inch to five-sixteenths inch have been used successfully.

The term "stiff" or "stiffness" has been used in this disclosure in accordance with accepted nomenclature for materials of construction to designate materials having a high modulus of elasticity, i.e., a high ratio of stress to deformation, whereupon such materials deform very little for a given load. It will also be appreciated that the balls 41 are made of materials having high strength which term is also intended to define the fact that such balls are non-fracturable and non-crushable.

Thus, once the balls are held compacted in position by the devices 52 they will transmit forming forces through each other and to the member 25 being formed yet without damage to either the member 25 or the balls 41.

Reference has been made above to the forming of single or multi-passageway hollow extruded members and in one application of this invention members made of an aluminous material and having a so-called Class 3 designation as defined by the Aluminum Association in their third edition of "Aluminum Standards and Data" were successfully formed; and, each of such members is defined as a member having a peripheral cross-sectional outline greater than a 5 inch diameter circumscribing circle and at least one continuous passage therethrough which has a cross-sectional area greater than 0.110 square inch. For certain types of automotive bumper components, the wall thicknesses of such members are generally such as to require forming presses rated at several hundred thousand pounds.

In this disclosure of the invention the member 25 is shown being formed using end support devices or plugs 36 which are axially slidable or movable relative to such member; however, it will be appreciated that, if desired, such plugs 36 may be held in fixed positions relative to such member by suitable clamps, pins, or the like, during the forming operation.

While present exemplary embodiments of this invention, and methods of practicing the same, have been illustrated and described, it will be recognized that this invention may be otherwise variously embodied and practiced within the scope of the following claims.

What is claimed is:

1. A method of forming an elongated tubular member made of a metallic material, said method comprising the steps of, introducing a plurality of substantially spherical balls in said member, said balls being made of a substantially non-fracturable and non-crushable material having a stiffness and strength at least substantially equal to the stiffness and strength of said metallic material, holding said balls confined within said member in a compacted manner with end support devices, and forming said member transversely to its elongated dimension while holding said balls compacted therein, said forming step being achieved while resiliently supporting each of said end support devices with a predetermined force of controlled magnitude applied substantially parallel to the elongated dimension of and toward the center of said member to maintain said balls in a compacted condition.

2. A method as set forth in claim 1 in which said spherical balls are of different sizes.

3. A method as set forth in claim 1 in which said metallic material is an aluminous material and said balls are made of steel.

4. A method as set forth in claim 3 in which said aluminous member is an extruded member which has a peripheral cross-sectional outline greater than a 5 inch diameter circumscribing circle and at least one continuous passage therethrough which has a cross-sectional area greater than 0.110 square inch and said steel balls range in diameter from one-eighth inch to five-sixteenths inch.

5. A method of forming an elongated open-ended tubular member made of a metallic material and having a substantially planar web separating said member into a pair of adjoining compartments, said method comprising the steps of, introducing a plurality of substantially spherical balls in said member, said balls being made of a substantially non-fracturable and non-crushable material having a stiffness and strength which is at least substantially equal to the stiffness and strength of said metallic material, holding said balls confined within said member in a compacted manner, and bending said member transversely to its elongated dimension while holding said balls compacted therein, said compacting of the balls serving the dual purpose of preventing said web from buckling while simultaneously preventing collapse of said member during said bending step, said holding step comprising holding said balls with plug devices each received within an associated end of said member, said holding step comprising the step of supporting each plug device for movement relative to its associated end, with said supporting step comprising yieldingly urging each plug device substantially parallel to the elongated dimension of and toward the center of said member with a predetermined compacting force of controlled magnitude to maintain said balls compacted.

6. A method as set forth in claim 5 particularly adapted to form said member and define a contoured bumper structure for a vehicle wherein said introducing step comprises introducing said balls having different sizes.

7. A method of forming an automotive bumper component from an elongated tubular member made of a metallic material, said member having open ends and a substantially planar web separating said member into a pair of adjoining compartments with each compartment extending the full length of said member, said method comprising the steps of, placing an end plug in the open end of each compartment at one end of said member, introducing a plurality of substantially spherical balls into each of the adjoining compartments of said member, said balls being made of a substantially non-fracturable and non-crushable material having a stiffness and strength which is at least substantially equal to the stiffness and strength of said metallic material, placing an end plug in the opposite open end of each compartment to define an assembly, placing said assembly within a forming press having a die and a cooperating punch, holding said balls confined within said member in a compacted manner with said end plugs, and forming said member to define a contoured structure, said forming being achieved by the cooperating action of said die and punch in a direction substantially transverse its elongated dimension by applying forming forces substantially coplanar with and parallel to the plane of said web while holding said balls compacted therein, said compacting of the balls serving the dual purpose of preventing said web from buckling while simultaneously preventing collapse of said member during said forming step, said holding step comprising the step of supporting each end plug for movement relative to its associated end, with said supporting step comprising yieldingly urging each end plug substantially parallel to the elongated dimension of and toward the center of said member with a predetermined compacting force of controlled magnitude to maintain said balls compacted.

8. A method as set forth in claim 7 and comprising the further step of removing said balls by removing the end plugs at one end of said member and lifting said member toward a vertical position to allow said balls to move from within said member under the influence of gravity.

9. An apparatus for forming an elongated tubular member made of a metallic material to obtain a contoured tubular construction, said apparatus comprising, a plurality of substantially spherical balls made of a substantially non-fracturable and non-crushable material having a stiffness and strength which is at least substantially equal to the stiffness and strength of said metallic material, end support means adapted to hold said balls confined within said member in a compacted manner to define a loaded assembly, a die, a punch, said die and punch being adapted to be relatively moved toward each other against opposed surfaces of said assembly to produce said contoured construction, and means for yieldingly urging said end support means substantially parallel to the elongated dimension of and toward the center of said member with a predetermined compacting force of controlled magnitude to assure said balls are firmly compacted during relative movement of said punch and die against opposed surfaces of said assembly.

10. An apparatus as set forth in claim 9 in which said means for yieldingly urging comprises a plurality of devices, said end support means comprises a plurality of end plugs each of which initially extends outwardly of the end of said member associated therewith and has an outside surface adapted to be engaged by an associated device.

11. An apparatus as set forth in claim 10 in which said punch has end actuating structures at its opposite ends, each actuating structure having an inclined cam surface which is adapted to engage an associated device and move the device a predetermined distance against an associated end plug to assure said balls are firmly compacted during relative movement of said die and punch toward each other.

12. An apparatus as set forth in claim 9 in which said balls are made of steel.

13. An apparatus as set forth in claim 11 in which said balls are made of steel and have different sizes, and each end plug is a metal plug having an outside configuration which conforms closely to the inside configuration of said tubular member and is axially slidable therewithin.

* * * * *